(12) United States Patent
Nevalainen et al.

(10) Patent No.: US 10,081,168 B2
(45) Date of Patent: Sep. 25, 2018

(54) HEAT-SEALABLE BIODEGRADABLE PACKAGING MATERIAL, A PACKAGE OR A CONTAINER MADE THEREOF, AND USE OF A RESIN IN EXTRUSION COATING

(75) Inventors: Kimmo Nevalainen, Kotka (FI); Ville Ribu, Lappeenranta (FI)

(73) Assignee: STORA ENSO OYJ, Helsinki (FI)

( * ) Notice: Subject to any disclaimer, the term of this patent is extended or adjusted under 35 U.S.C. 154(b) by 699 days.

(21) Appl. No.: 14/232,112

(22) PCT Filed: Jun. 20, 2012

(86) PCT No.: PCT/FI2012/050640
§ 371 (c)(1),
(2), (4) Date: Jan. 28, 2014

(87) PCT Pub. No.: WO2013/007872
PCT Pub. Date: Jan. 17, 2013

(65) Prior Publication Data
US 2014/0147604 A1 May 29, 2014

(30) Foreign Application Priority Data
Jul. 12, 2011 (FI) ..................... 20115745

(51) Int. Cl.
B32B 29/00 (2006.01)
D21H 27/10 (2006.01)
D21H 19/28 (2006.01)
D21H 19/82 (2006.01)
C09D 167/04 (2006.01)
(Continued)

(52) U.S. Cl.
CPC ............ *B32B 29/002* (2013.01); *B29C 41/30* (2013.01); *B32B 1/02* (2013.01); *B32B 27/08* (2013.01);
(Continued)

(58) Field of Classification Search
None
See application file for complete search history.

(56) References Cited

U.S. PATENT DOCUMENTS 5,883,199 A 3/1999 McCarthy et al.
2003/0102080 A1* 6/2003 Mallik .................. C09J 7/0246
156/325

(Continued)

FOREIGN PATENT DOCUMENTS

EP 1 193 294 A2 4/2002
JP 2003-128080 A 5/2003
(Continued)

OTHER PUBLICATIONS

International Search Report, dated Nov. 9, 2012, issued in PCT/FI2012/050640.
(Continued)

Primary Examiner — Michael P Rodriguez
(74) Attorney, Agent, or Firm — Birch, Stewart, Kolasch & Birch, LLP

(57) ABSTRACT

The invention concerns a heat-sealable biodegradable packaging material, which comprises a fibrous substrate (1) and one or more polymer coating layers (2) extruded onto said substrate. According to the invention the packaging material includes at least one polymer coating layer (2) containing at least 70 weight-% of polylactide (PLA) and at least 5 weight-% of polybutylene succinate (PBS) or its derivate blended therewith. Optionally an acryl copolymer such as ethylene butyl acrylate glycidyl methacrylate terpolymer (EBAGMA) may be included in the polymer blend. The invention further concerns a heat-sealed container, such as a disposable drinking cup, and a heat-sealed product package made from the packaging material, as well as uses of PBS or its derivates as blends with PLA in extrusion coating, for improving adhesivity of the coating to the fibrous substrate and reduced raw edge penetration to the packaging material, especially penetration of hot coffee held in the drinking cup.

9 Claims, 5 Drawing Sheets

(51) Int. Cl.
*C08L 67/04* (2006.01)
*B29C 41/30* (2006.01)
*B32B 27/08* (2006.01)
*B32B 27/10* (2006.01)
*B32B 27/30* (2006.01)
*B32B 27/36* (2006.01)
*B32B 1/02* (2006.01)
*B65D 65/46* (2006.01)

(52) U.S. Cl.
CPC ............ *B32B 27/10* (2013.01); *B32B 27/308* (2013.01); *B32B 27/36* (2013.01); *B65D 65/466* (2013.01); *C08L 67/04* (2013.01); *C09D 167/04* (2013.01); *D21H 19/28* (2013.01); *D21H 19/824* (2013.01); *D21H 27/10* (2013.01); *B32B 2250/02* (2013.01); *B32B 2250/03* (2013.01); *B32B 2250/40* (2013.01); *B32B 2255/00* (2013.01); *B32B 2255/12* (2013.01); *B32B 2255/26* (2013.01); *B32B 2255/28* (2013.01); *B32B 2270/00* (2013.01); *B32B 2307/31* (2013.01); *B32B 2307/7163* (2013.01); *B32B 2307/7265* (2013.01); *B32B 2439/00* (2013.01); *B32B 2439/02* (2013.01); *B32B 2439/70* (2013.01); *Y02W 90/12* (2015.05); *Y02W 90/13* (2015.05); *Y10T 428/1303* (2015.01); *Y10T 428/31895* (2015.04)

(56) References Cited

U.S. PATENT DOCUMENTS

| | | | |
|---|---|---|---|
| 2004/0248486 A1* | 12/2004 | Hodson | B32B 27/04 442/79 |
| 2005/0131120 A1* | 6/2005 | Flexman | C08L 67/04 524/399 |
| 2005/0151296 A1 | 7/2005 | Obuchi et al. | |
| 2005/0192410 A1 | 9/2005 | Scheer et al. | |
| 2007/0259195 A1 | 11/2007 | Chou et al. | |
| 2010/0181372 A1* | 7/2010 | Huang | B65D 1/265 229/403 |

FOREIGN PATENT DOCUMENTS

| | | | | |
|---|---|---|---|---|
| JP | 2003128080 A | * | 5/2003 | |
| JP | 2010-69767 A | | 4/2010 | |
| WO | WO 00/01530 A1 | | 1/2000 | |
| WO | WO 2009/064052 A1 | | 5/2009 | |
| WO | WO 2009/064052 A1 | * | 5/2009 | ........... C09D 167/02 |
| WO | WO 2011/110750 A1 | | 9/2011 | |
| WO | WO 2012/120199 A1 | | 9/2012 | |

OTHER PUBLICATIONS

Written Opinion of the International Searching Authority, dated Nov. 9, 2012, issued in PCT/FI2012/050640.

* cited by examiner

HEAT-SEALABLE BIODEGRADABLE PACKAGING MATERIAL, A PACKAGE OR A CONTAINER MADE THEREOF, AND USE OF A RESIN IN EXTRUSION COATING

The present invention concerns a heat-sealable biodegradable packaging material, which comprises a fibrous substrate and one or more polymer coating layers extruded onto said substrate. The invention also concerns heat-sealed containers and product packages comprising the packaging material according to the invention, as well as uses of a resin in extrusion coating, in particular to produce the packaging material and the container or package according to the invention.

BACKGROUND OF THE INVENTION

The fibre-based packaging material of product packages, such as packing paper or board, is usually provided with a polymeric coating that makes the package tight and by means of which the package can be closed by heat sealing. Similar polymer-coated paper or board is also used for disposable tableware, such as heat-sealed drinking cups. Polyolefins, such as low-density polyethylene (LDPE), are widely used for coating due to their good heat-sealability. A disadvantage of the usual polyolefins is, however, that they are not biodegradable.

Polylactide (PLA), which has reasonably good moisture and gas barrier properties that are sufficient to many applications, has been used as the coating polymer of biodegradable packaging material; however, its use involves a number of problems. Polylactide as such is stiff and fragile, requiring a high extrusion temperature and a fairly large layer thickness to stick to the fibre substrate of the packaging material. Because of the high temperature, polylactide runs the risk of deterioration, and in extrusion, the edges of a molten web tend to tear and pin holes easily remain in the extruded layer.

To solve the extrusion problems EP-1094944 B1 discloses an inner adhesion layer, which is co-extruded together with an outer polylactide layer and which consists of a biodegradable polymer, examples of which, according to the specification, include some commercial copolyesters, cellulose esters, and polyester amides.

Another problem with the use of polylactide in the outer coating layer of the packaging material is its fairly high melting point, and the resulting poor heat sealing ability. As an improvement to this US-2002/0065345 A1 discloses a biodegradable aliphatic polyester that is blended with polylactide, its portion in the mixture being at least 9%, and a tackifier, its portion in the mixture being at least 1%. As suitable aliphatic polyesters, the publication mentions polycaprolactone (PLC) and polybutylene succinate adipate (PBSA). According to the reference the mixture can be extruded into a film, which can be axially or biaxially stretched and which can be attached to the fibre substrate by lamination.

US 2005/0192410 A1 describes polylactide films and coatings, wherein the processibility of polylactide is improved by blending with it 10-40 weight-% of polycaprolactone and 5-10 weight-% of mineral particles. According to the reference the mixture can be used in extrusion coating, but there is no mention of its adhesion to the fibre substrate or of its heat-sealability. Instead, the reference describes intermediate layers between the substrate and the PLA-based coating layer or the top layers that come on top of the PLA layer; cf. section [0039] in the specification.

US 2007/0259195 A1 describes polylactide-based films, which contain, blended therewith, 0.1-10 weight-% of biodegradable polymeric additive, the purpose of which is to increase the crystallinity of the polylactide, improving its heat resistance. As examples of such additives the reference presents FEPOL 2040 marketed by Far Eastern Textile, Taiwan, and Ecoflex marketed by BASF, both of which comprise polybutylene adipate terephthalate (PBAT). According to the reference the mixtures can be extruded onto the fibre substrate in a conventional manner, but there is no mention of the adhesion of the mixture to the substrate or of the heat-sealability of the coating thus obtained. In the reference the intended improved heat resistance of PLA does not, however, suggest improved heat-sealability but rather its weakening.

SUMMARY OF THE INVENTION

The approach of the present inventors was to find a biodegradable polymer blend that could be extruded directly to a paper or board substrate, so as to obtain a packaging material suitable for biodegradable packages and, in particular, biodegradable containers such as disposable drinking cups. The aim is thus to replace the usual non-biodegradable LDPE with a biodegradable polymer that could be used in a similar manner, without an intermediate adhesive layer such as in EP-1094944 B1 or proceeding by way of film lamination such as in US-2002/0065345 A1.

The inventors have thus worked with polylactide and its modifications, attempting to improve its extrudability, adhesivity to paper or board and heat-sealability so as to turn it suitable for sealed drinking cups in particular. However, they were faced with a particular problem, which was raw-edge penetration (REP) of the liquid from the cup to the fibre-based cup wall material. REP is a well-known phenomenon, which has been quite successfully counteracted by tailor-made sizing compositions in the fibrous substrate. Such sizing compositions are known in the art and are useful in connection with the present invention. However, due to the weaker adhesivity of polylactide as compared with LDPE the route for liquid penetration to the packaging material tends to be between the fibrous substrate and the extruded coating layer. Micropores not filled with polymer are assumed to be the ultimate reason for the problem. The REP problem is especially harmful with hot coffee, which tarnishes the white-coloured cup material along the vertical heat-seal in the cupwall, thus disfiguring the cup in a way that is unacceptable for the market.

The problem solved by the present invention is to provide polymer-coated, biodegradable packaging material, wherein the coating containing a polylactide blend has an improved adhesion to the fibrous substrate together with reduced raw-edge penetration to the packaging material. According to the invention, the solution is that the packaging material includes, in direct contact to the fibrous substrate, at least one extruded polymer coating layer containing at least 70 weight-% of polylactide and at least 5 weight-% of polybutylene succinate (PBS) or a derivate thereof.

DETAILED DESCRIPTION OF THE INVENTION

Figure 1:
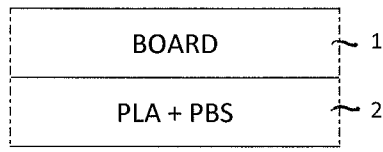
FIG. 1 shows a substrate 1 with a single extruded coating layer 2 of a blend of PLA+PBS.

According to tests carried out by the inventors blending of PBS with PLA improves adhesion of a coating layer consisting of the blend in extrusion onto a fibrous board substrate. At the same time raw edge penetration of hot coffee in drinking cups made of the polymer-coated paperboard thus obtained is significantly reduced, which is seen as markedly less, if any, brown colouring along the vertical heat-seal lines in the cup jacket. Without binding the invention to a theory, PBS and its close derivates with similar properties are believed to soften the PLA blend and have it penetrate deeper to the micropores in the surface of the fibrous substrate, blocking the routes for liquid penetration between the fiber and polymer coating layers. The improved adhesion is also supposed to increase the ability of the coating to withstand the vapour pressure generated within the fibrous substrate by the hot drink, thus preventing the coating from loosening from the substrate layer and opening pathways to liquid penetration.

According to the invention the preferred polymer blended with PLA is polybutylene succinate (PBS). Derivates of polybutylene succinate with like properties are an alternative, in particular polybutylene succinate adipate (PBSA), which was also tested by the inventors with positive results.

As a third component the blend may comprise a minor amount, at most about 5% by weight, an acrylate copolymer, such as ethylene butyl acrylate glycidyl methacrylate terpolymer (EBAGMA). The packaging material of the invention may thus comprise a polymer coating layer containing a blend of (i) 70 to 95 weight-%, preferably 75 to 90 weight-%, of polylactide, (ii) 5 to 25 weight-%, preferably 10 to 20 weight-% of polybutylene succinate or a derivate thereof and (iii) 0 to 5 weight-% of an acrylate copolymer.

The acrylate polymer is added to further improve the adhesion of the extruded polymer coating layer to the fibrous substrate. Acrylate polymers, including EBAGMA, are as such non-biodegradable, but when used in small amounts of 5 weight-% at most do not prevent biodegrading of the coating layer as a whole.

The fibrous substrate in the packaging material may be paper or board, paper-board as well as cardboard.

The extruded biodegradable polymer coating layer as discussed above shall be in a direct contact with the fibrous substrate of the packaging material. PBS or its derivate, such as PBSA, serves to improve adhesion of the coating layer to the underlying fibrous substrate. In case of a multilayer coating said coating layer would be the lowermost layer.

The biodegradable polymer coating layer as discussed above may also form the uppermost surface layer of the coated packaging material. In this case PBS or its derivate, such as PBSA, serves to improve the heat-sealability of the polymer coated packaging material. Addition of a minor amount of acrylate copolymer, such as EBAGMA, further improves heat-sealability of the coating layer. If the coating is a monolayer coating its aim is to improve both adhesion to the fibrous substrate and heat-sealability.

In case of a coextruded multilayer coating each layer should substantially consist of biodegradable polymers so as to secure biodegradability of the packaging material as a whole. The material may have a polymer coating on one side or on both sides thereof. The coatings on the opposite sides of the fibrous substrate may be similar or differ from each other.

A useful embodiment of the invention is a packaging material having coextruded inner and outer coating layers, the inner layer comprising a blend of PLA, PBS or its derivate and, optionally, acrylate copolymer such as EBAGMA, and the outer layer comprising polybutylene adipate terephtalate (PBAT), preferably in a blend with PLA. The inner layer would provide superior adhesion in extrusion to the fibrous substrate and the outer layer would provide superior heat-sealability to an uncoated fibrous surface or to a polymer layer, similar or dissimilar to said outer heat-seal layer itself.

The invention further comprises a method of manufacturing a packaging material as described in the above. According to this method the components of the polymer blend are melted from granules and blended at a single step, immediately followed by extrusion of the melt onto a paper or board substrate.

The heat-sealed product package according to the invention is a closed package partially or, preferably, completely made of the packaging material as described above.

The invention particularly provides an improved container made of the packaging material as described above. Disposable drinking cups for hot drinks, especially hot coffee, are a prime example of such containers.

The invention includes use of polybutylene succinate (PBS) or a derivative thereof as a blend with polylactide for improved adhesion of a coating of said blend extruded onto a fibrous paper or board substrate of a packaging material. In connection with the improved adhesion the particular aim is to use the blend for reduced raw edge penetration in liquid packages or containers such as disposable drinking cups made from the packaging material.

Furthermore, the invention includes use of polybutylene succinate (PBS) or a derivative thereof and ethylene butyl acrylate glycidyl methacrylate terpolymer (EBAGMA) as a blend with polylactide, either for improved adhesion of a coating of said blend extruded onto a fibrous paper or board substrate, or for improved heat-sealability of an extruded polymer coating of said blend.

EXAMPLES

FIGS. 1-5 show as examples five structural embodiments of the packaging material according to the invention. There are extruded or coextruded monolayer or multilayer coatings of a blend of polylactide (PLA) and polybutylene succinate (PBS) and mere polylactide on one side or on both sides of a fibrous paper or board substrate ("board"). The share of PLA in the blend is 70 to 95 weight-%, preferably 75 to 90 weight-%, and the share of PBS may vary from 5 to 25 weight-%, preferably being 10 to 20 weight-%. As an optional third component at most 5 weight-% of an acrylate copolymer such as ethylene butyl acrylate glycidyl methacrylate terpolymer (EBAGMA) may be included in the blend. The substrate may be paper, paperboard or cardboard of a weight of 40 to 350 g/m², preferably a cupboard or a liquid package board of 170 to 350 g/m².

Usefully PBS is available as a commercial product under trade name GsPLA FZ91PD by Mitsubishi, and EBAGMA is commercially available under trade name Biomax Strong 120 by DuPont.

Figure 2:
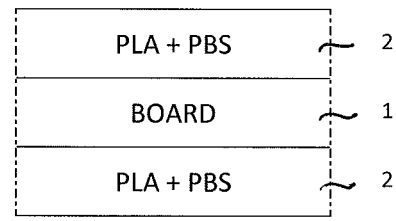
FIG. 2 shows a PLA+PBS blend layer 2 on both sides of a substrate 1.
Figure 3:
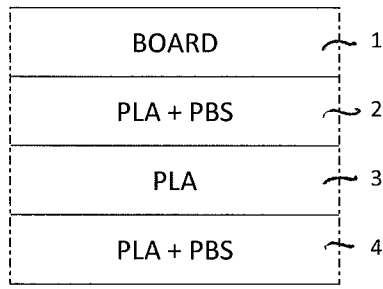
FIG. 3 shows a coextruded multilayer coating with an innermost PLA+PBS blend layer 2, a middle layer 3 of PLA, and an outermost PLA+PBS blend layer 4.
Figure 4:
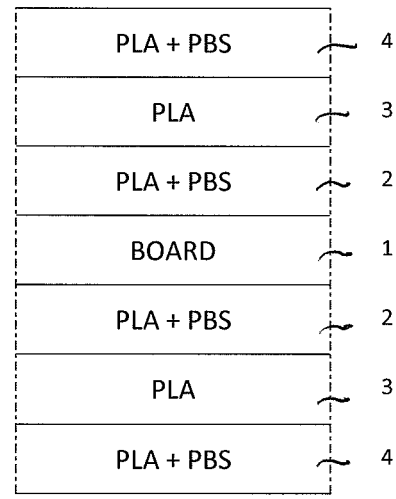
FIG. 4 shows multilayer coatings 2, 3, 4 on both sides of a substrate 1.

More particularly, FIG. 1 shows the substrate 1 with a single extruded coating layer 2 of the blend of PLA and PBS. The weight of this monolayer 2 may be from 10 to 30 g/m². In FIG. 2 there is such a PLA+PBS blend layer 2 on both sides of the substrate 1. FIG. 3 shows a coextruded multilayer coating with an innermost PLA+PBS blend layer 2, a middle layer 3 of PLA, and an outermost PLA+PBS blend layer 4. The weight of each of the three layers 2, 3, 4 may be from 4 to 13 g/m². The total weight of the multilayer coating is thus 12-39 g/m². PLA is the cheaper polymer material in the blend, and including a middle layer 3 of PLA serves to add to the total thickness of the coating while reducing its cost. FIG. 4 shows similar multilayer coatings 2, 3, 4 on both sides of the substrate 1.

Figure 5:
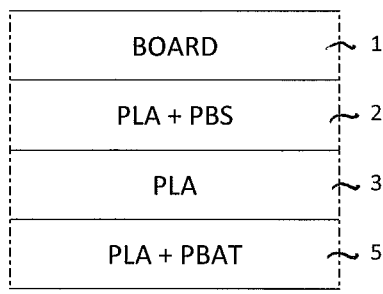
FIG. 5 shows a packaging material comprising a board substrate 1 and coextruded innermost, middle, and outermost coating layers 2, 3, 5.

FIG. 5 shows as a further embodiment of the invention a packaging material comprising a board substrate 1 and coextruded innermost, middle and outer-most coating layers 2, 3, 5. Only the innermost layer 2 consists of a PLA+PBS blend as described above. The middle layer 3 consists of mere PLA. The outermost heat-sealing layer 5 comprises a blend of about 55 weight-% of PLA and 45 weight-% of polybutylene adipate terephtalate (PBAT). Such a PLA+PBAT blend is commercially available under trade name Ecovio by BASF. The weights of the three coating layers 2, 3, 5 may correspond to the respective layers 2, 3, 4 in the embodiment of FIG. 3.

If the packaging material has extruded polymer coatings on both sides, the coatings on the opposite sides need not be identical. There may be a mono-layer coating on one side and a multilayer coating on the other side of the fibrous substrate. It is also possible to include in multilayer coatings layers of other biodegradable polymers suitable for extrusion coating, preferably in blends with polylactide. FIG. 5 is an example of such embodiments. In addition to PBAT, other examples of useful polymers are PHA (polyhydroxy alkanoate), PHB (polyhydroxy butyrate), PHBV (polyhydroxybutyrate hydroxyvalerate), PGA (polyglycolic acid), PEG (polyethylene glycol), PCL (polycaprolactane), and starch based biopolymers. The innermost layer of the multilayer structure shall be of the blend containing PLA and PBS or its derivate, however.

Tests

In the following the invention is illustrated by means of laboratory tests. Extrusion grade polylactide was used as the basic coating polymer, which was blended with 10, 15 and 20 weight-% of polybutylene succinate (GsPLA FZ91PD by Mitsubishi) and 10 and 15 weight-% of polybutylene succinate adipate (GsPLA AD92WD by Mitsubishi). The blends as well as pure PLA as a reference were then extruded as monolayers of about 25 g/m² onto one side of a board substrate having a weight of 280 g/m². The true coating weights were measured and varied slightly, between 24.9 and 27.6 g/m² (the black columns in FIG. 6), due to the coating techniques.

Figure 6:
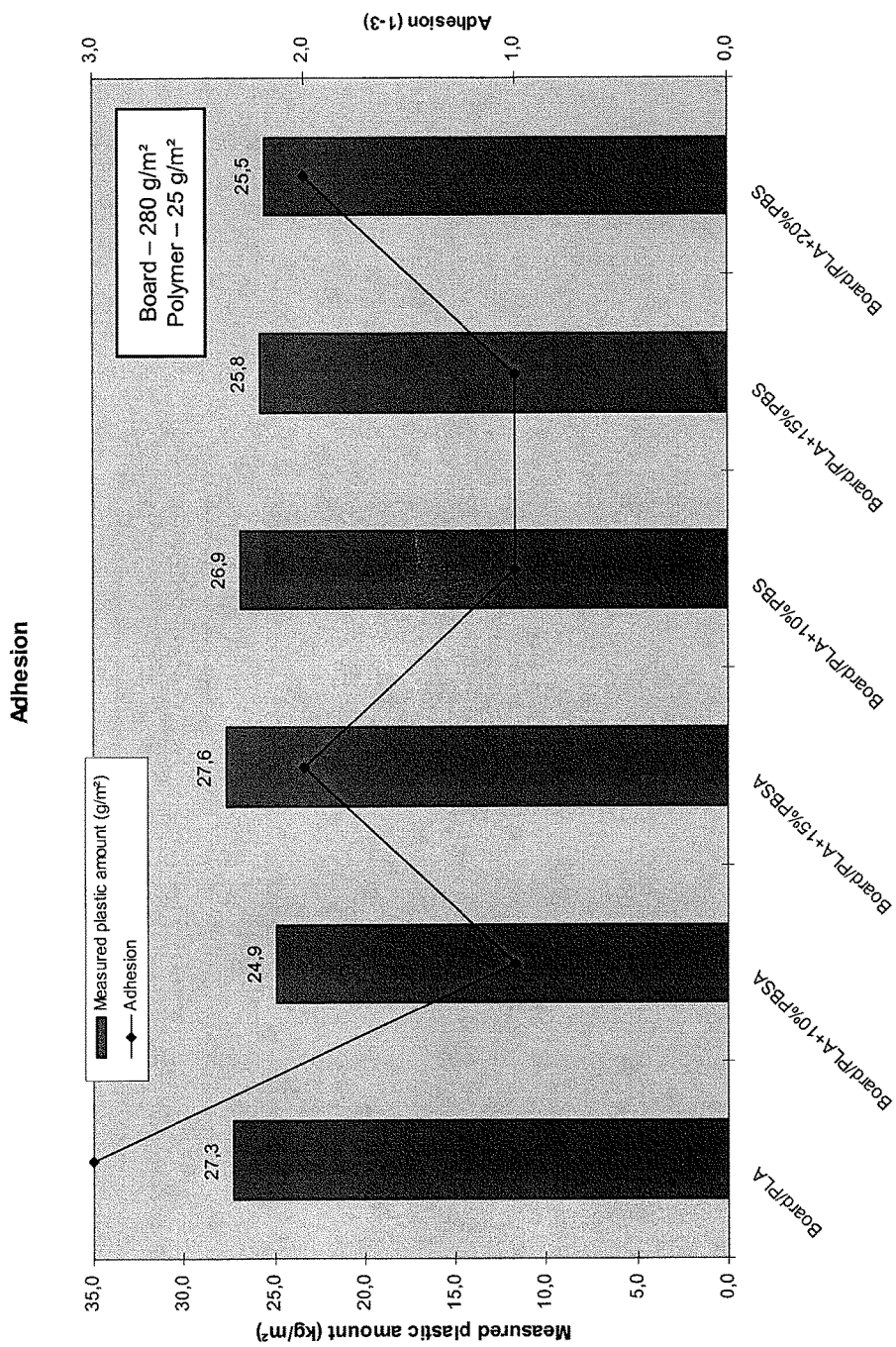
FIG. 6 depicts the results of adhesion tests.

For each coated test material adhesion to the board substrate was determined on a scale from 0 to 3, the highest figure representing the worst adhesion. The results are shown in FIG. 6. In each case addition of PBS or PBSA to PLA improved the adhesion value from 3 to 1 or 2.

Figure 7:
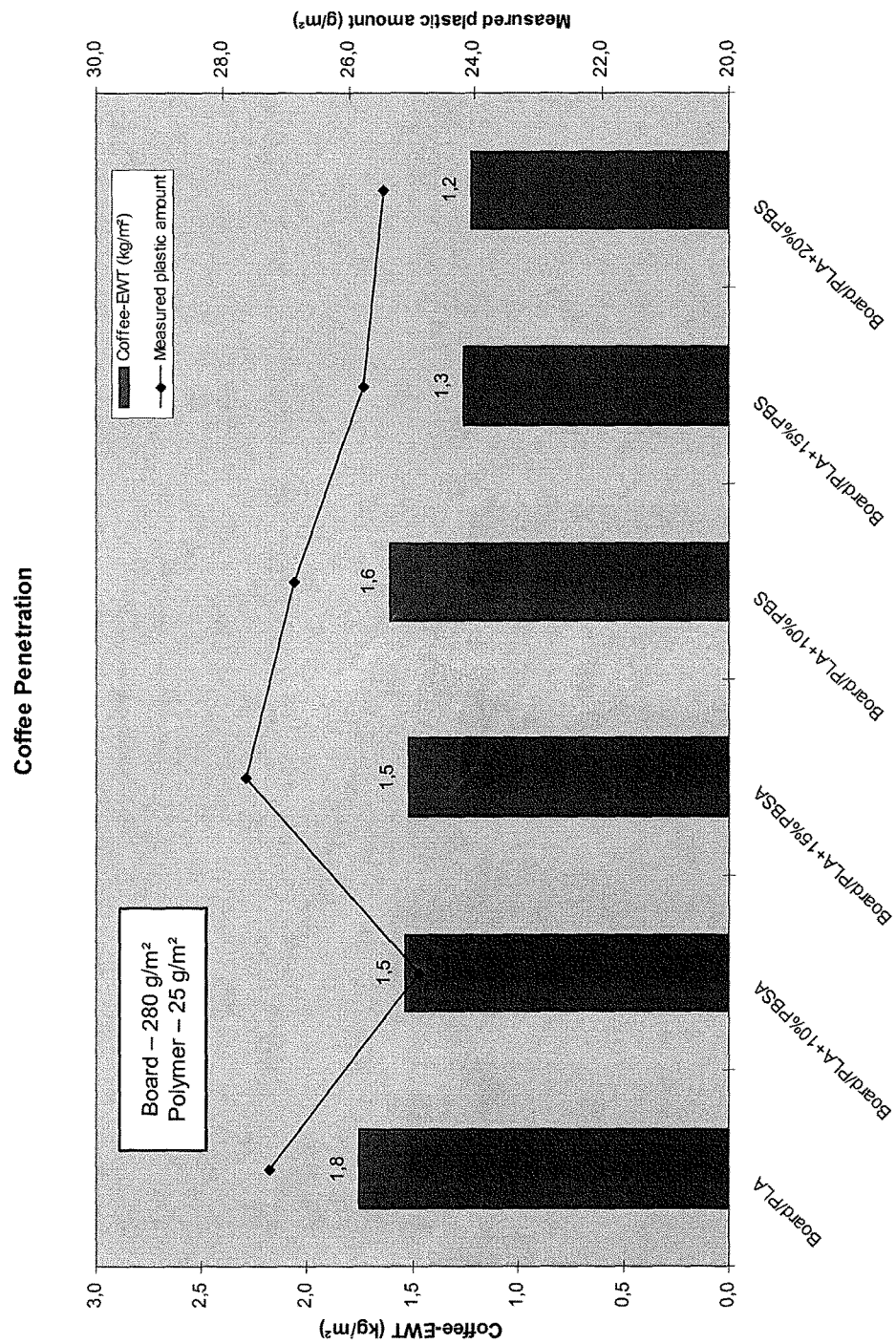
FIG. 7 depicts the results of coffee penetration, with measured weight changes due to REP.

Each coated test material was then subjected to raw edge penetration (REP) test with use of hot black coffee at a temperature of about 80° C. (brand Juhla Mokka by Paulig, cooked with a Moccamaster cooker according to Paulig's recommendations). A piece of 100 cm² was cut from each material, was weighed as dry and submerged to the coffee to a depth of 5 cm for 10 minutes. The test pieces were then dried from the outside with suction paper and weighed immediately thereafter. The increase in weight indicates the raw edge penetration. In FIG. 7 the black columns represent the raw edge penetration for each polymer coated board tested. With each polymer blend the result improved from that with mere PLA, most remarkably with 15 or 20 weight-% of PBS.

Figure 8:
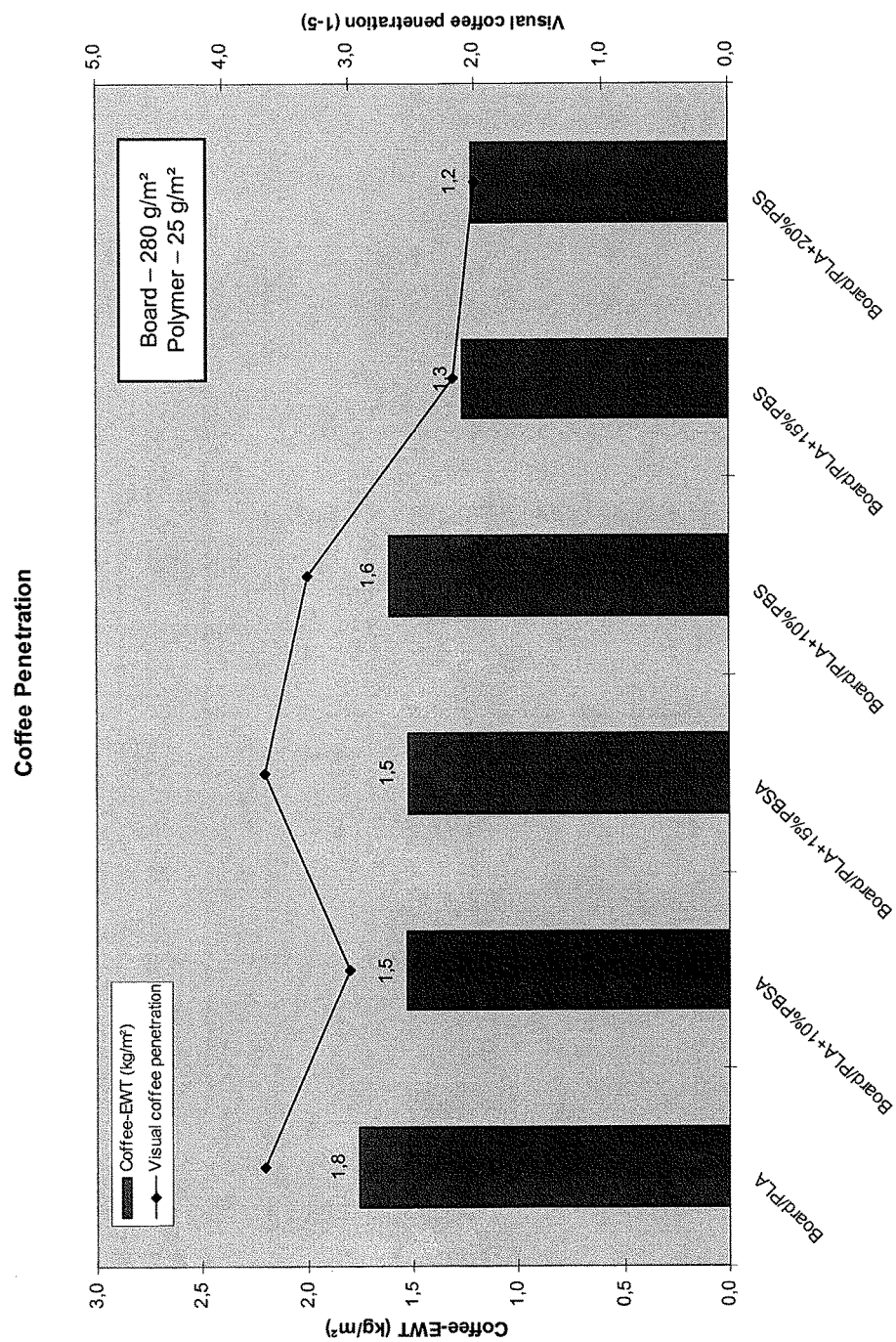
FIG. 8 depicts the results of coffee penetration tests, with REP assessed visually.

The raw edge penetration was then assessed visually on a scale from 0 to 5, the highest figure representing the worst result. The results, which are seen in FIG. 8, differ slightly from the measured results of FIG. 7, but the superior results with 15 and 20 weight-% of PBS in PLA are unequivocally confirmed.

Figure 9:
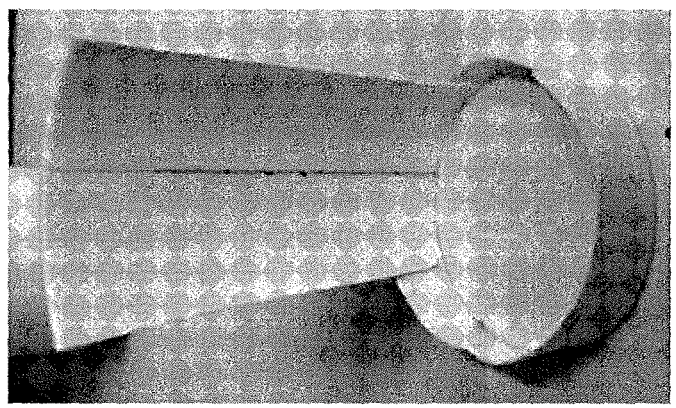
FIG. 9 shows vertical sealing lines inside test cups.
Figure 9:
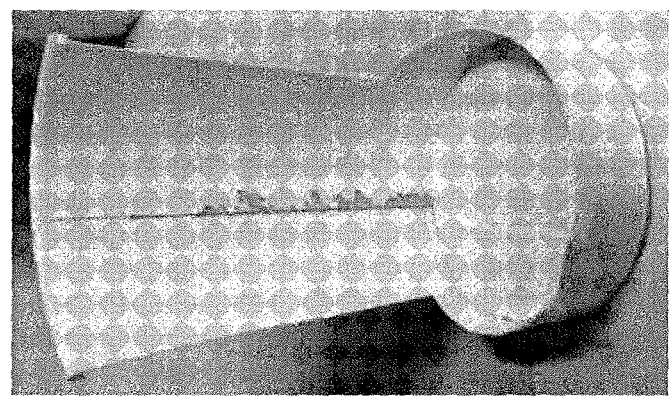

Drinking cups were made by heat-sealing from two of the above test materials, namely the board coated with mere PLA (reference) and the board coated with PLA+20 weight-% of PBS (invention). A visual REP test was performed for these cups by filling them with the above hot black coffee for 10 minutes. FIG. 9 shows the test cups after the test, cut open so as to show the vertical sealing lines on the inside of the cupwall. The cup of PLA-coated board is on the left and the cup of the board coated with PLA+20% of PBS is on the right. The substantial improvement gained by the invention is immediately recognizable. The market would accept the cup according to the invention on the right, but would reject the reference cup on the left because of the visible tarnish left by the hot coffee.

The invention claimed is:

1. A method of reducing raw edge penetration, in (i) a heat-sealed liquid-containing package made from packaging material comprising fibrous paper or board substrate and heat-sealable polymer coating or (ii) a heat-sealed disposable drinking cup made from packaging material comprising fibrous paper or board substrate and heat-sealable polymer coating, by improving adhesion of the polymer coating onto said fibrous paper or board substrate, which method comprises
   directly contacting said fibrous paper or board substrate with at least one polymer coating layer comprising polybutylene succinate (PBS) as a blend with polylactide,
   forming the material into a package or a cup by heat-sealing, while bringing said at least one polymer coating layer together with a raw edge to face the interior of the package or the cup, and
   permitting a liquid contained in the package or the cup to contact the raw edge, with reduced penetration of the liquid through the raw edge into the fibrous substrate of the material.

2. The method of claim 1 for reduced raw edge penetration in disposable drinking cups made from the packaging material.

3. The method of claim 1, which comprises employing polybutylene succinate (PBS) and ethylene butyl acrylate glycidyl methacrylate terpolymer (EBAGMA) as said blend with polylactide for improved adhesion of a coating of said blend extruded onto a fibrous paper or board substrate.

4. The method of claim 1, which comprises employing polybutylene succinate (PBS) and ethylene butyl acrylate glycidyl methacrylate terpolymer (EBAGMA) as a blend with polylactide, wherein said method also improves the heat-sealability of the extruded polymer coating of said blend.

5. The method of claim 1, wherein at least one polymer coating layer containing at least 70 weight-% of polylactide and at least 5 weight-% of polybutylene succinate is placed into direct contact with the fibrous substrate.

6. The method of claim 1, wherein said at least one polymer coating layer contains a derivative of polybutylene succinate, said derivative being polybutylene succinate adipate (PBSA).

7. The method of claim 1, wherein said at least one polymer coating layer contains a blend of (i) 70 to 95 weight-% of polylactide, (ii) 5 to 25 weight-% of polybutylene succinate, and (iii) 0 to 5 weight-% of an acrylate copolymer.

8. The method of claim 7, characterized in that said at least one polymer coating layer contains a blend of (i) 75 to 90 weight-% of polylactide, (ii) 10 to 20 weight-% of polybutylene succinate, and (iii) 0 to 5 weight-% of ethylene butyl acrylate glycidyl methacrylate terpolymer.

9. The method of claim 1, wherein said at least one polymer coating layer forms an inner layer that is directly adhered to the fibrous substrate, and wherein an outer layer containing polybutylene adipate terephthalate (PBAT) forms a heat-sealable surface layer of the packaging material.

* * * * *